United States Patent
Wiacek

(10) Patent No.: US 11,802,950 B2
(45) Date of Patent: Oct. 31, 2023

(54) TIME-OF-ARRIVAL-BASED METHOD FOR RANGE-BASED FILTERING

(71) Applicant: Nokia Technologies Oy, Espoo (FI)

(72) Inventor: Fabian Wiacek, Warsaw (PL)

(73) Assignee: Nokia Technologies Oy, Espoo (FI)

( * ) Notice: Subject to any disclaimer, the term of this patent is extended or adjusted under 35 U.S.C. 154(b) by 6 days.

(21) Appl. No.: 17/637,007

(22) PCT Filed: Aug. 18, 2020

(86) PCT No.: PCT/FI2020/050535
§ 371 (c)(1),
(2) Date: Feb. 21, 2022

(87) PCT Pub. No.: WO2021/044076
PCT Pub. Date: Mar. 11, 2021

(65) Prior Publication Data
US 2022/0291370 A1     Sep. 15, 2022

Related U.S. Application Data

(60) Provisional application No. 62/896,843, filed on Sep. 6, 2019.

(51) Int. Cl.
*G01S 11/02* (2010.01)

(52) U.S. Cl.
CPC ..................... *G01S 11/02* (2013.01)

(58) Field of Classification Search
CPC ...... G01S 11/02; G01S 5/0273; G01S 5/0278; G01S 5/0294; G01S 5/02213; G01S 15/582

(Continued)

(56) References Cited

U.S. PATENT DOCUMENTS

| 8,463,298 B2 * | 6/2013 | Kim ........................ H04W 8/10 455/456.2 |
| 9,070,236 B1 * | 6/2015 | DiEsposti .............. G01C 21/20 |

(Continued)

FOREIGN PATENT DOCUMENTS

| WO | 2019/162562 A1 | 8/2019 |
| WO | 2021/045786 A1 | 3/2021 |

OTHER PUBLICATIONS

International Search Report and Written Opinion received for corresponding Patent Cooperation Treaty Application No. PCT/FI2020/050535, dated Nov. 10, 2020, 16 pages.

(Continued)

*Primary Examiner* — Bo Fan
(74) *Attorney, Agent, or Firm* — Harrington & Smith

(57) ABSTRACT

A disclosed method includes receiving a time-of-arrival range filter configuration and a reference signal physical transmission time from a network node at a reference signal physical reception time. The time-of-arrival range filter configuration includes at least one of a time-of-arrival filter status, a time-of-arrival filter distance range, and a time-of-arrival configuration. A time difference between the reference signal physical reception time and the reference signal physical transmission time is determined, and a distance to the network node based on the time difference is calculated. Whether the distance is within the time-of-arrival filter distance range is determined, and the time-of-arrival filter status is determined. Based on the time-of-arrival filter status, actions are performed in accordance with the time-of-arrival configuration applicable for the distance.

20 Claims, 10 Drawing Sheets

(58) Field of Classification Search
USPC .................. 342/458, 451, 463, 387, 357.29
See application file for complete search history.

(56) References Cited

U.S. PATENT DOCUMENTS

| | | | | |
|---|---|---|---|---|
| 10,317,509 | B2* | 6/2019 | Fischer | H04L 5/0048 |
| 2013/0285855 | A1* | 10/2013 | Dupray | H04W 4/029 |
| | | | | 342/451 |
| 2019/0045477 | A1* | 2/2019 | Edge | H04W 64/00 |
| 2019/0230475 | A1 | 7/2019 | Edge et al. | |

OTHER PUBLICATIONS

"New WID: NR Positioning Support", 3GPP TSG RAN Meeting #84, RP-190854, Agenda: 9.1.1, Intel Corporation, Jun. 3-6, 2019, 6 pages.
"RAT Independent and Hybrid Positioning Solutions", 3GPP TSG-RAN WG1 Meeting AH1901, R1-1900918, Agenda: 7.2.10.2, Qualcomm Incorporated, Jan. 21-25, 2019, pp. 1-5.
"3rd Generation Partnership Project; Technical Specification Group Radio Access Network; Evolved Universal Terrestrial Radio Access (E-UTRA); Physical layer; Measurements (Release 15)", 3GPP TS 36.214, V15.2.0, Jun. 2018, pp. 1-24.

\* cited by examiner

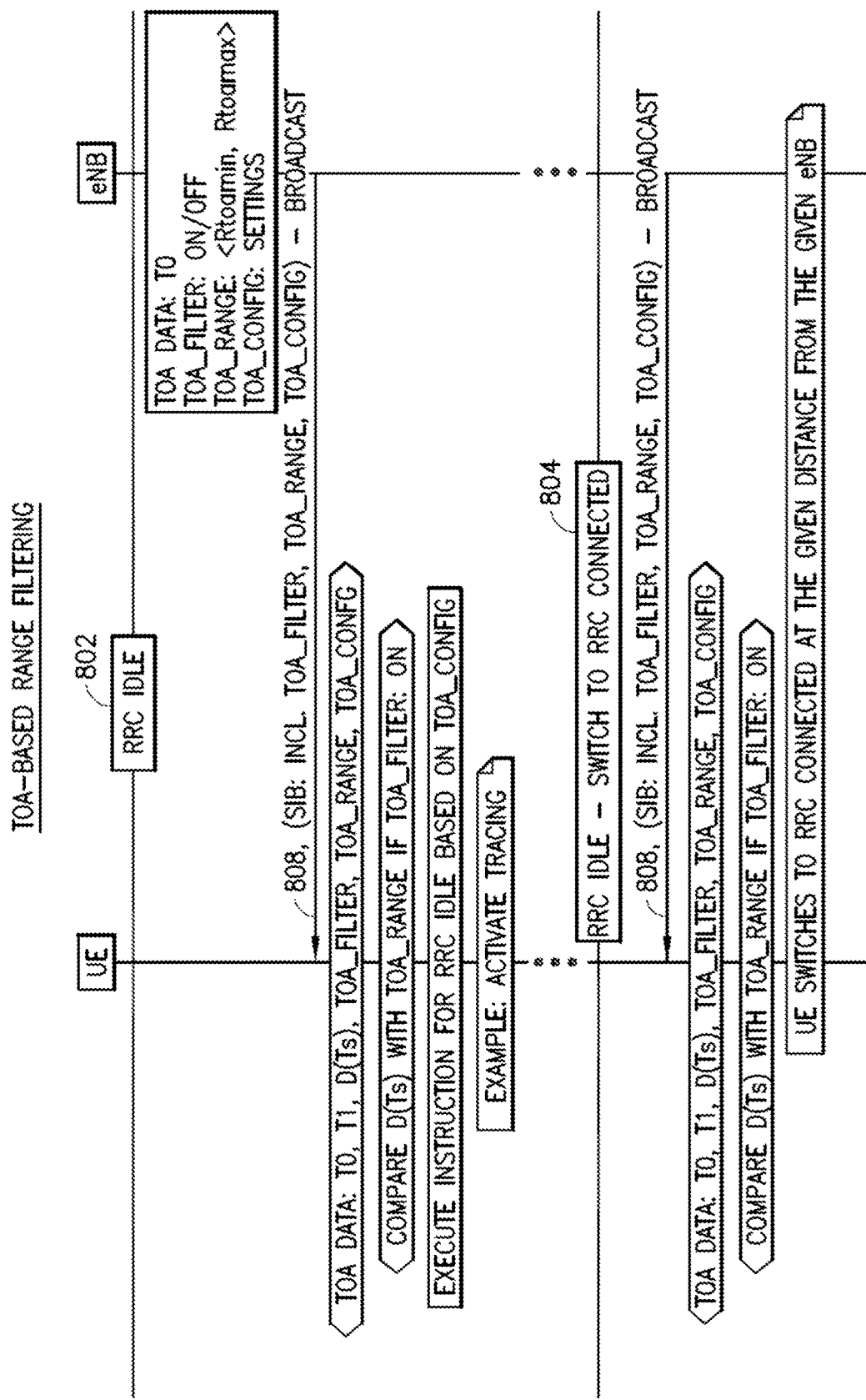

TIME-OF-ARRIVAL-BASED METHOD FOR RANGE-BASED FILTERING

RELATED APPLICATION

This application was originally filed as PCT Application No. PCT/FI2020/050535, filed on Aug. 18, 2020, which claims priority from U.S. Application No. 62/896,843, filed on Sep. 6, 2019, each of which is incorporated herein by reference in its entirety.

TECHNICAL FIELD

This disclosure concerns range-based filtering. More specifically, a time-of-arrival method for range-based filtering is disclosed.

BACKGROUND

Timing advance (TA) range-based filtering has been the subject of much discussion.

In this regard, the benefits of range-based filtering may be said to include the following:

- The isolation of groups of user equipments (UEs) with high radio-resource demands, such as those at mass events.
- A more efficient management of resources, such as improved throughput in a given area.
- A "fair" allocation of radio resources in a cell or in a given sector to reduce problems with connections.
- Minimization of the impact of radio jamming, such as improved filtering in case of smart attacks.
- New cell deployment scenarios, which may be adapted to customer needs.
- Management of coverage redundancy such as by only using full cell capacity in a given area.
- Improvement in coverage where needed, such as by adding a cell to serve UEs only on the edge of coverage.

However, up to now, mechanisms for handling some scenarios has been lacking. Examples of such scenarios are:

a) The isolation of groups of UEs with high radio-resource demands, such as those at mass events, where enormous radio-resource demands may drain all available radio resources from a given cell. This may have an impact on the connection of other UEs within the same cell, but away from the high-demand area.
b) An improvement of cell-capacity management in a given area or at the end of cell coverage.
c) An improvement in case of smart attacks, which drain radio resources.
d) Enhanced coverage and cell redundancy management.
e) Minimization of overhead control signaling related to load-balancing issues.
f) Reduction of radio-resource consumption for predictable, distance-based activities.

It should be understood, in the discussion to follow, that the term "gNB" should be understood to mean "network node". The term "gNB" is used to denote a network node in 5G. However, it should be understood that the present invention, as described below, is not limited to 5G, but may be applicable to other generations yet to be developed or to earlier generations being further developed. As a consequence, "gNB" should be understood more broadly as a network node.

SUMMARY

In a first aspect of the present disclosure, a method comprises: receiving a time-of-arrival range filter configuration and a reference signal physical transmission time from a network node at a reference signal physical reception time, said time-of-arrival range filter configuration including at least one of a time-of-arrival filter status, a time-of-arrival filter distance range, and a time-of-arrival configuration; determining a time difference between the reference signal physical reception time and the reference signal physical transmission time; calculating a distance to the network node based on the time difference; determining whether the distance is within the time-of-arrival filter distance range; determining the time-of-arrival filter status; and, based on the time-of-arrival filter status, performing actions in accordance with the time-of-arrival configuration applicable for the distance.

In a second aspect of the present disclosure, an apparatus comprises: at least one processor; and at least one memory including computer program code, the at least one memory and the computer program code being configured, with the at least one processor, to cause the apparatus to perform the following: receive a time-of-arrival range filter configuration and a reference signal physical transmission time from a network node at a reference signal physical reception time, said time-of-arrival range filter configuration including at least one of a time-of-arrival filter status, a time-of-arrival filter distance range, and a time-of-arrival configuration; determine a time difference between the reference signal physical reception time and the reference signal physical transmission time; calculate a distance to the network node based on the time difference; determine whether the distance is within the time-of-arrival filter distance range; determine the time-of-arrival filter status; and, based on the time-of-arrival filter status, perform actions in accordance with the time-of-arrival configuration applicable for the distance.

In a third aspect of the present disclosure, an apparatus comprises: means for receiving a time-of-arrival range filter configuration and a reference signal physical transmission time from a network node at a reference signal physical reception time, said time-of-arrival range filter configuration including at least one of a time-of-arrival filter status, a time-of-arrival filter distance range, and a time-of-arrival configuration; means for determining a time difference between the reference signal physical reception time and the reference signal physical transmission time; means for calculating a distance to the network node based on the time difference; means for determining whether the distance is within the time-of-arrival filter distance range; means for determining the time-of-arrival filter status; and means for performing actions in accordance with the time-of-arrival configuration applicable for the distance based on the time-of-arrival filter status.

In a fourth aspect of the present disclosure, a computer program product comprises a non-transitory computer-readable storage medium bearing computer program code embodied therein for use with a computer, the computer program code comprising code for performing: receiving a time-of-arrival range filter configuration and a reference signal physical transmission time from a network node at a reference signal physical reception time, said time-of-arrival range filter configuration including at least one of a time-of-arrival filter status, a time-of-arrival filter distance range, and a time-of-arrival configuration; determining a time difference between the reference signal physical reception time and the reference signal physical transmission time; calculating a distance to the network node based on the time difference; determining whether the distance is within the time-of-arrival filter distance range; determining the time-of-arrival filter status; and, based on the time-of-arrival filter status, performing actions in accordance with the time-of-arrival configuration applicable for the distance.

In a fifth aspect of the present disclosure, a method comprises: generating a time-of-arrival range filter configuration, said time-of-arrival range filter configuration including at least one of a time-of-arrival filter status, a time-of-arrival filter distance range, and a time-of-arrival configuration; and one of broadcasting and transmitting the time-of-arrival range filter configuration to a user equipment at a reference signal physical transmission time to the user equipment for use in time-of-arrival range-based filtering.

In a sixth aspect of the present disclosure, an apparatus comprises: at least one processor; and at least one memory including computer program code, the at least one memory and the computer program code being configured, with the at least one processor, to cause the apparatus to perform the following: generate a time-of-arrival range filter configuration, said time-of-arrival range filter configuration including at least one of a time-of-arrival filter status, a time-of-arrival filter distance range, and a time-of-arrival configuration; and one of broadcast and transmit the time-of-arrival range filter configuration to a user equipment at a reference signal physical transmission time to the user equipment for use in time-of-arrival range-based filtering.

In a seventh aspect of the present disclosure, an apparatus comprises: means for generating a time-of-arrival range filter configuration, said time-of-arrival range filter configuration including at least one of a time-of-arrival filter status, a time-of-arrival filter distance range, and a time-of-arrival configuration; and one of means for broadcasting and means for transmitting the time-of-arrival range filter configuration to a user equipment at a reference signal physical transmission time to the user equipment for use in time-of-arrival range-based filtering.

In an eighth aspect of the present disclosure, a computer program product comprises a non-transitory computer-readable storage medium bearing computer program code embodied therein for use with a computer, the computer program code comprising code for performing: generating a time-of-arrival range filter configuration, said time-of-arrival range filter configuration including at least one of a time-of-arrival filter status, a time-of-arrival filter distance range, and a time-of-arrival configuration; and one of broadcasting and transmitting the time-of-arrival range filter configuration to a user equipment at a reference signal physical transmission time to the user equipment for use in time-of-arrival range-based filtering.

BRIEF DESCRIPTION OF THE DRAWINGS

The foregoing and other aspects of these teachings are made more evident in the following detailed description, when read in conjunction with the attached drawing figures.

DETAILED DESCRIPTION

Figure 1:
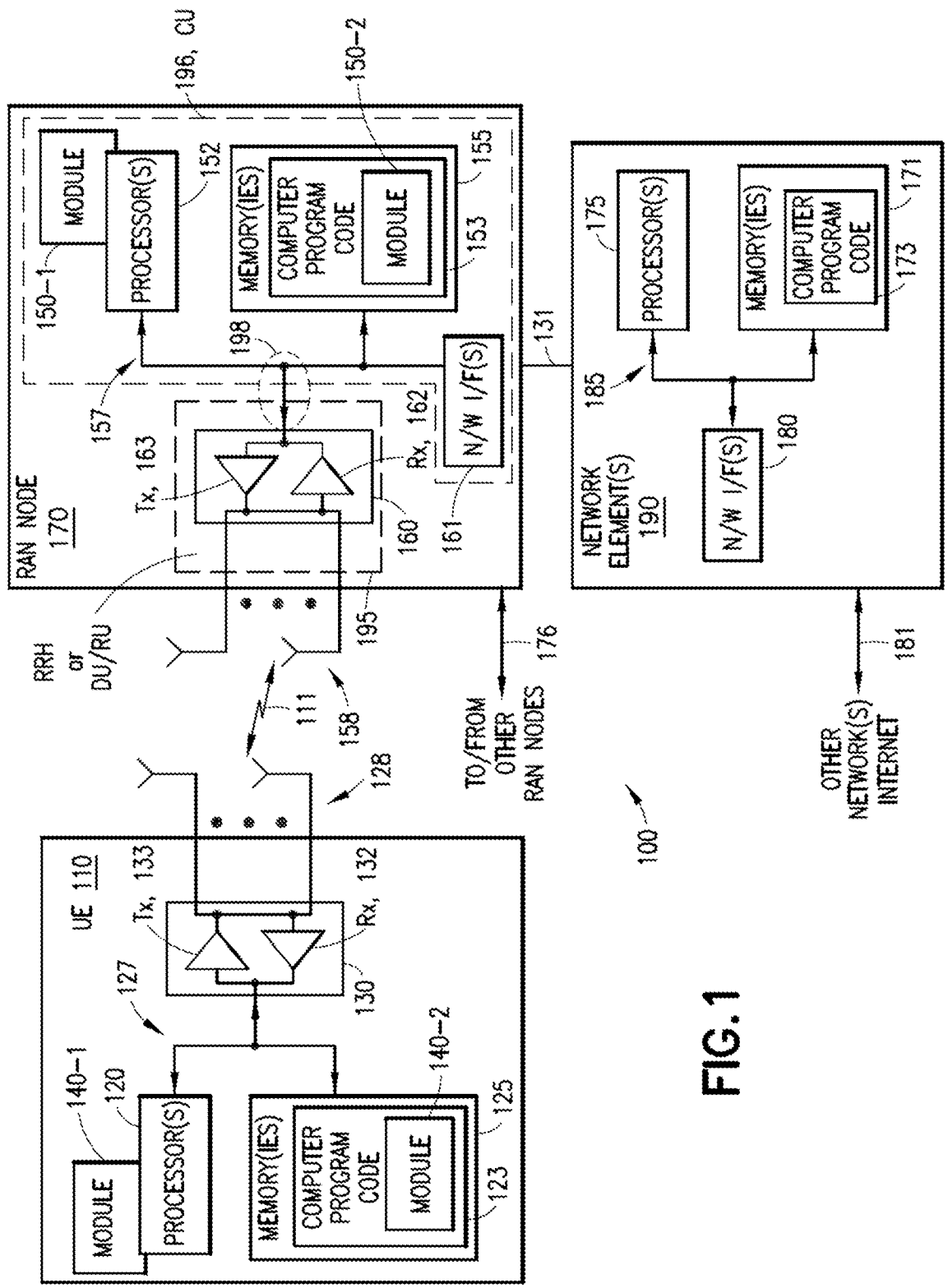
FIG. 1 shows a simplified block diagram of certain apparatus in which the subject matter of the present disclosure may be practiced.

FIG. 1 is a block diagram of one possible and non-limiting example in which the subject matter of the present disclosure may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device, typically mobile, that can access the wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured, with the one or more processors 120, to cause the user equipment 110 to perform one or more of the operations as described herein. The UE 110 communicates with RAN node 170 via a wireless link 111.

The RAN node 170 in this example is a base station that provides access by wireless devices, such as the UE 110, to the wireless network 100. The RAN node 170 may be, for example, a base station for 5G, also called New Radio (NR). In 5G, the RAN node 170 may be an NG-RAN node, which is defined as either a gNB or an ng-eNB. A gNB is a node providing NR user plane and control-plane protocol terminations toward the UE, and connected via the NG interface to a 5GC, such as, for example, the network element(s) 190. The ng-eNB is a node providing E-UTRA user plane and control plane protocol terminations towards the UE, and connected via the NG interface to the 5GC. The NG-RAN node may include multiple gNBs, which may also include a centralized unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or ng-eNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, for example, as part of a RU, but some examples of this may have the transceiver 160 as part of a separate RU, for example, under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, module 150 may be implemented as module 150-2, which is implemented as computer program code 153 executed by the one or more processors 152. For instance, the one or more memories 155 and the computer program code 153 are configured, with the one or more processors 152, to cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (e.g., a centralized unit (CU), gNB-CU) of the RAN node 170 to the RRH/DU 195. Reference 198 also indicates those suitable network link(s).

It is noted that description herein indicates that "cells" perform functions, but it should be clear that equipment which forms the cell will perform the functions. The cell makes up part of a base station. That is, there can be multiple cells per base station. For example, there could be three cells for a single carrier frequency and associated bandwidth, each cell covering one-third of a 360° area so that the single base station's coverage area covers an approximate oval or circle. Furthermore, each cell can correspond to a single carrier and a base station may use multiple carriers. So if there are three 120° cells per carrier and two carriers, then the base station has a total of six cells.

The wireless network 100 may include a network element or elements 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, for example, an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured, with the one or more processors 175, to cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer-readable memories 125, 155, and 171 may be of any type suitable to the local technical environment and may be implemented using any suitable data storage technology, such as semiconductor-based memory devices, flash memory, magnetic memory devices and systems, optical memory devices and systems, fixed memory and removable memory. The computer-readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Figure 2:
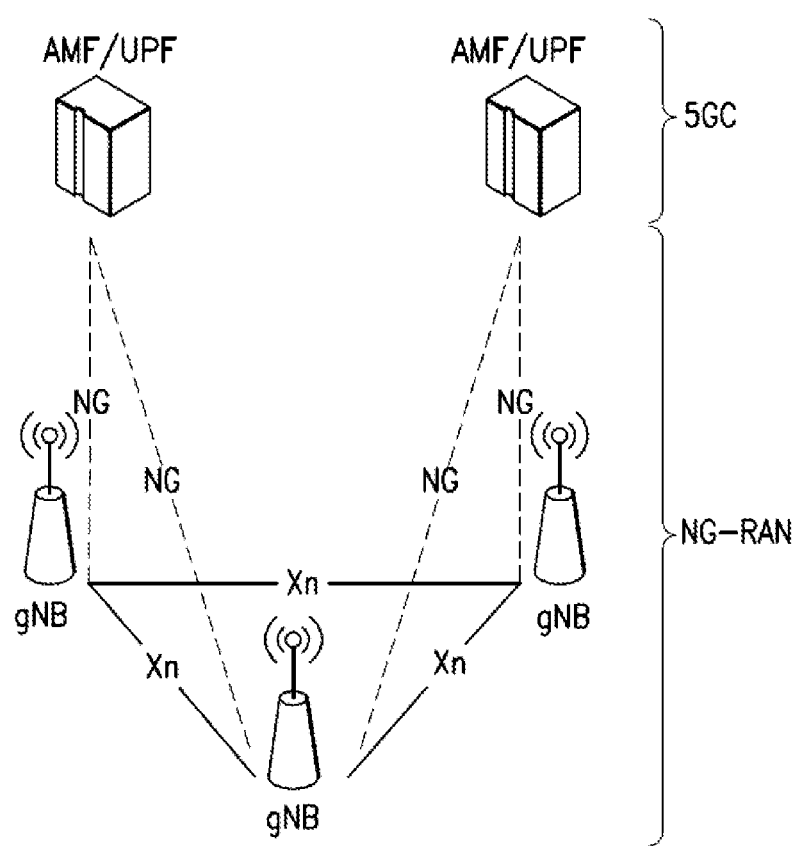
FIGS. 2 and 3 show an example of New Radio (NR) architecture having the 5G core (5GC) and the NG-RAN.
Figure 3:
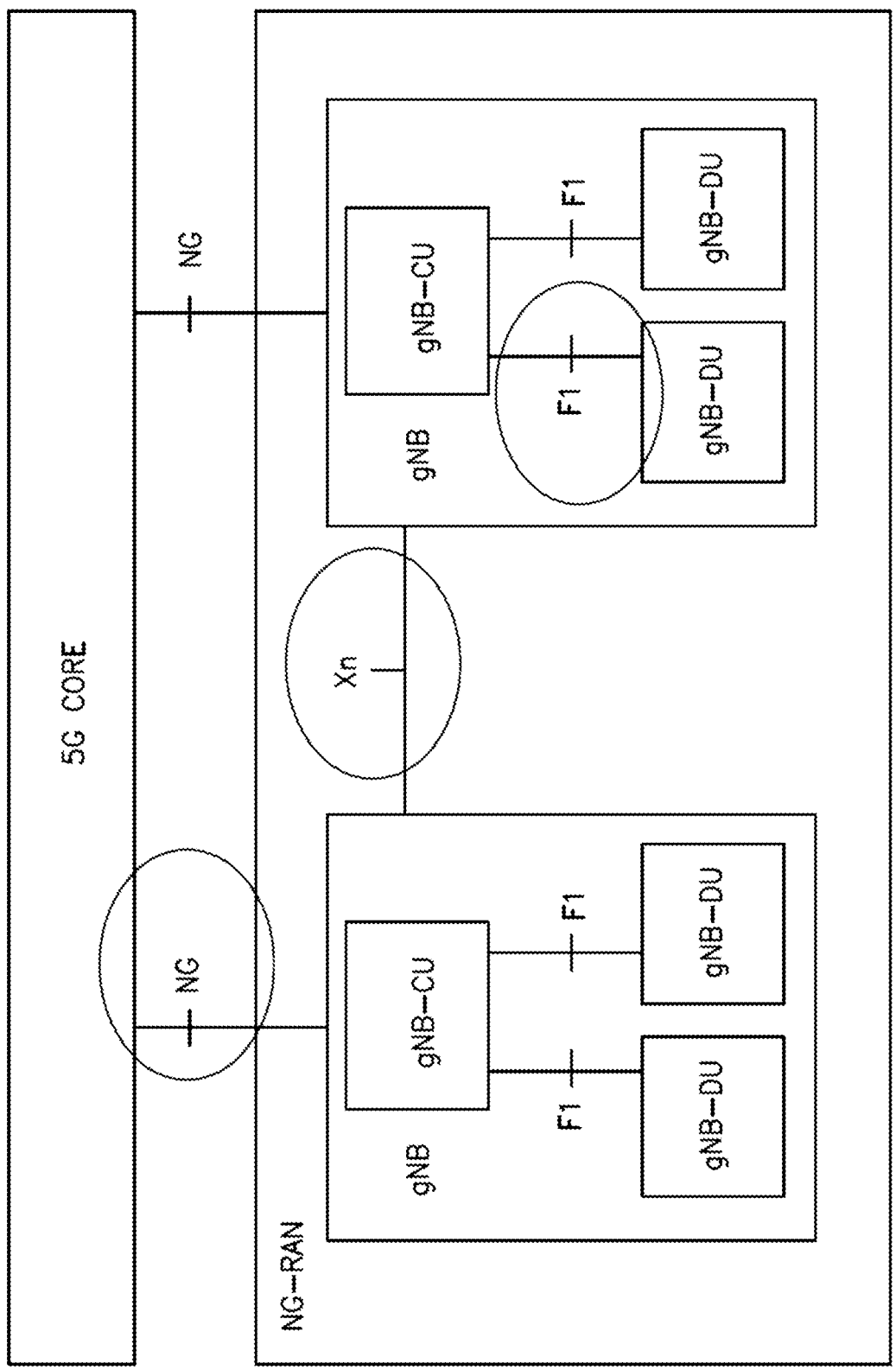

FIGS. 2 and 3 show an example of New Radio (NR) architecture having the 5G core (5GC) and the NG-RAN. The base stations gNB are coupled to the 5GC by the interface to core NGs, and the gNBs are coupled to each other by the inter-base station interface Xn.

Figure 4:
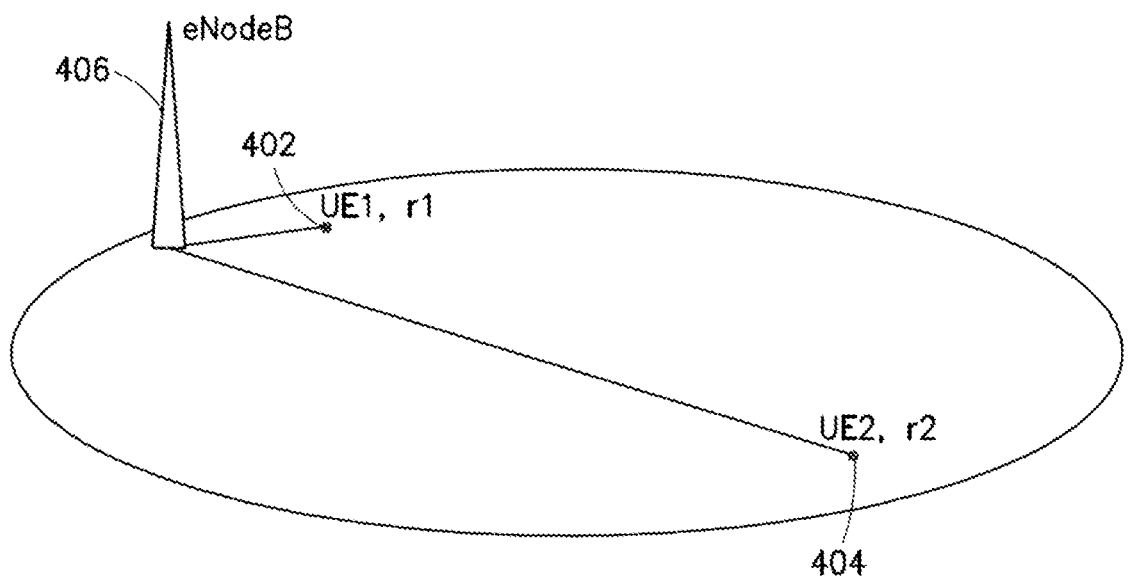
FIG. 4 illustrates UEs at different distances from an eNodeB.

FIG. 4 illustrates two UEs 402, 404 at different distances from an eNodeB 406. The UEs 402, 404 may be in an RRC_IDLE or an RRC_CONNECTED state at different distances with respect to the given eNB 406, which has the best signal strength, or which is a serving cell. The distance between the eNB antenna and a UE may be expressed as a timing advance (TA) value as in legacy (pre-5G), or the distance may be measured on a time-of-arrival (TOA) basis. For a TOA method, the eNB may broadcast information about a reference signal physical transmission time $T_0$. UEs 402, 404 may receive a reference signal and measure signal physical reception time $T_1$, and, based on the difference between $T_1$ and $T_0$, a TOA distance may be measured. The reference signal may be a selected regular frame, subframe or symbol.

A so-called timing advance (TA) Type 2 range filtering has recently been proposed. According to Type 2, once an eNB determines a distance to a given UE during a random access procedure, such as random access channel (RACH) preamble detection, filtering may be applied to the given UE based on an obtained TA index value. By filtering is meant that the UE may be handled by the eNB differently in accordance with a distance criterion, which may lead to a decision that the given UE will not be served. As this concept is based on a TA index value calculated by the eNB, the UE either needs to request radio resources from the eNB via a random access procedure, or it should already be served by the eNB.

Alternatively, the UE itself may be able to determine its distance to an eNB based on the reference signal time of a physical transmission broadcast by the eNB. This means that the UE has a TOA-based equivalent of timing advance distance even before the UE sends a request for radio resources; in other words, when the UE is in an RRC_IDLE state.

Figure 5:
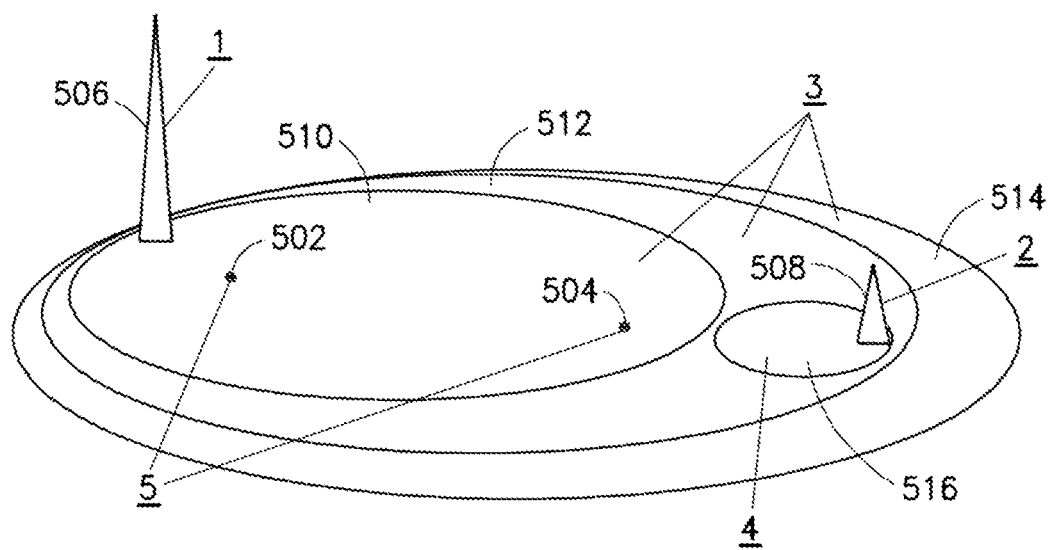
FIG. 5 illustrates multilayer HetNet coverage.

As shown in FIG. 5, which illustrates multilayer HetNet coverage, in typical cell deployment and coverage issues, UEs 502, 504 may be within coverage areas of many cells of different range, coverage, throughput, and other parameters. This may mean that the overall cell coverage versus throughput, for example, may differ, as illustrated in FIG. 5, and also may be dynamically changed with respect to UE radio-resource demands. This further supports the need for range-based filtering, in which more efficient radio resources may be provided, as in timing advance (TA) Type 2 range filtering.

In FIG. 5,
1. eNodeB macro cell tower antenna mast 506
2. eNodeB micro/pico/femto cell antenna mast 508
3. Macro cell coverage 510, 512, 514
4. Micro/pico/femto cell coverage 516
5. UEs 502, 504

Having thus introduced one suitable but non-limiting technical context for the practice of the example embodiments, the example embodiments will now be described with greater specificity.

In the present disclosure, methods are provided for a solution for TOA range-based filtering, which may be more effective than previous methods, as the UE may determine a distance to the eNB before making a radio-resource request; thus, such improved filtering may be more efficient. In addition, no radio access requests may be needed from the UE side to determine whether range-based filtering may be applied.

In accordance with the present disclosure, a UE may determine a distance to a given eNB by using $T_0$ and $T_1$ time markers, which correspond to physical reference signal transmission from the given eNB antenna system and reception by the UE, respectively. No other signaling or connection to the eNB is required. The reference signal may be a frame, a subframe, or a symbol of any synchronous wireless communication standard, such as GSM, LTE, and 5G. Using a TOA-based method, the UE may determine its distance to the given eNB using Equation 1 below with an accuracy determined by the system basic time unit $T_S$. In LTE, the basic time unit $T_S$ is defined as $1/(15000*2048)$ seconds.

Figure 6:
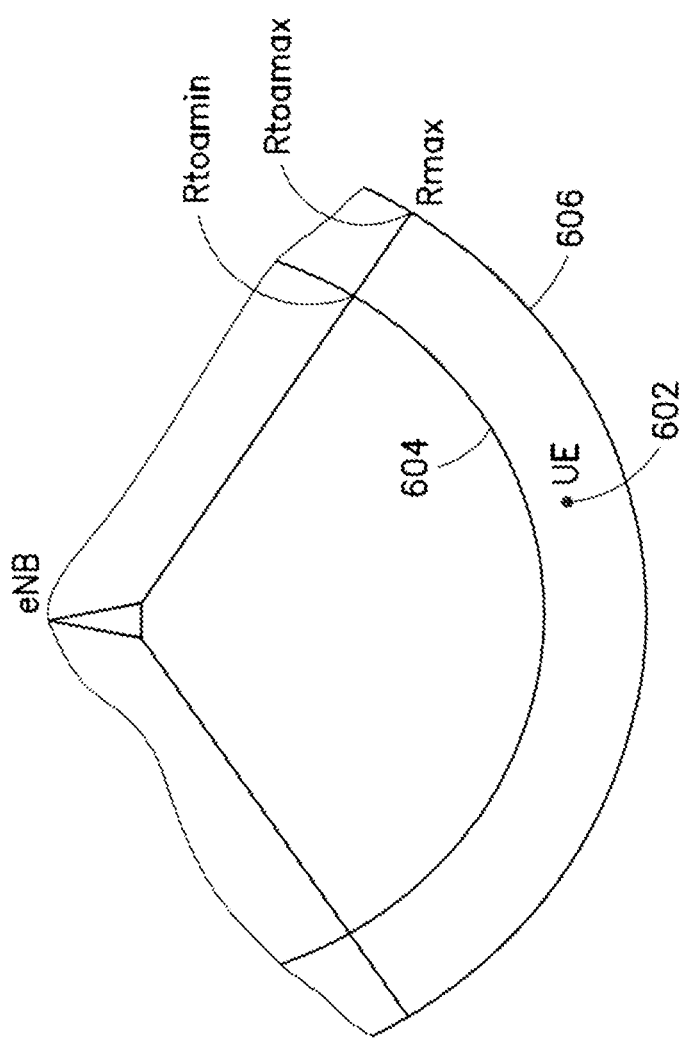
FIG. 6 illustrates an example of a TOA-based range filter application for a given cell.

Using the fact that a UE may be able to determine its relative distance to the given eNB, the eNB may differentiate UE handling by proper configuration of a TOA-based range filter, with defined ranges of applicability, as illustrated in FIG. 6. In this example, the TOA-based range filter may be configured to support coverage on the edge of the coverage of the given cell.

Figure 7:
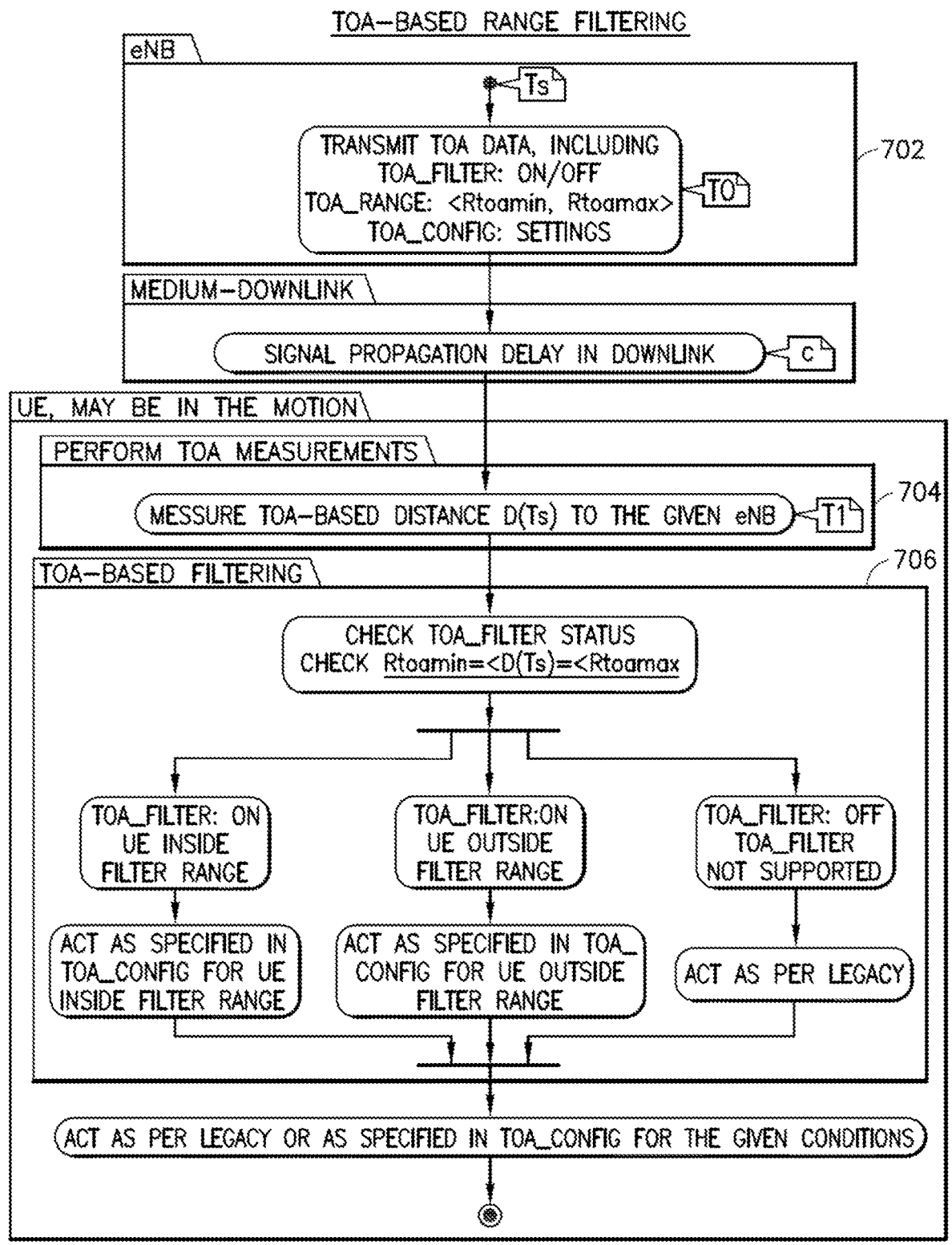
FIG. 7 illustrates an activity diagram for the present TOA filtering method.

FIG. 6 illustrates an example an application of a TOA-based range filter. Once the UE receives TOA data with settings for a TOA-based range filter from the given eNB, the UE may use Equation 1 below to determine whether a measured propagation delay distance $D(T_S)$ is within a defined TOA-based range filter, as expressed in Equation 2 below. As illustrated in FIG. 6, in this example, the UE 602 is within defined minimal and maximal ranges 604, 606 of the TOA-based range filter.

$$D(T_S)=c*(T_1-T_0) \tag{1}$$

where:
$T_0$=time of reference signal physical transmission by eNB,
$T_1$=time of reference signal physical reception by UE,
c=speed of light,
$T_S$=basic time unit,
$D(T_S)$=signal propagation delay distance
and:

$$R_{toamin} \leq D(T_S) \leq R_{toamax} \tag{2}$$

where:
$R_{toamin}$=lower range filter limit,
$R_{toamax}$=upper range filter limit,
$T_S$=basic time unit,
$D(T_S)$=signal propagation delay distance FIG. 7 illustrates an activity diagram for the present TOA-based range filtering method.

In block 702, the eNB may transmit or broadcast TOA data, which may include settings for the TOA-based range filter, such as TOA filter status, range boundaries, and instructions for a UE triggered on the given distance.

A configuration for the TOA-based range filter, including TOA-based filtering ON/OFF; $R_{toamin}$, $R_{toamax}$, and filter configuration-intended UE handling, may be broadcasted or transmitted as part of TOA data by SIBs.

In block 704, a UE, which supports the TOA method, may determine its distance ($D(T_S)$) to the given eNB.

In the next step, in block 706, UE logic may check whether the TOA-based range filter is active and, if so, the UE may verify the condition expressed by Equation 2. Based on the result, the UE may execute commands or instructions indicated in a filter configuration file (TOA_config) for INSIDE or OUTSIDE conditions, respectively.

Instructions provided in TOA_config may be operator configurable and may be static or dynamic.

When TOA-based range filter is not active or not supported, UE may behave as per legacy (pre-5G).

The benefits and possible application of a method related to range-based filtering, which uses an eNB-provided TA value for filtering purposes, have been documented elsewhere. In the present submission, TOA-based distance measurements are used for range-based filtering.

Apart from the benefits mentioned above, specific benefits for a TOA-based range filter include:

- Differentiation of UE measurements or reports, which may be requested based on distance criteria.
- Preventative load balancing, as a UE may be instructed in advance to request radio resources, when they are needed, to a particular eNB or cell, even when signal power or quality factors indicate that the UE should select this eNB or cell, which has an active TOA-based range filter.
- No additional radio transmission, apart from transmitted TOA data, may be needed from the eNB or the UE to configure the UE by the eNB with respect to a filter-defined configuration.
- No eNB-provided timing advance (TA) index value is needed for application of the method.

In summary, the present method may reduce radio resource allocation for UE configuration based on a distance criteria. Thus, improvements in eNB/UE capacity and performance may be expected.

Figure 8B:
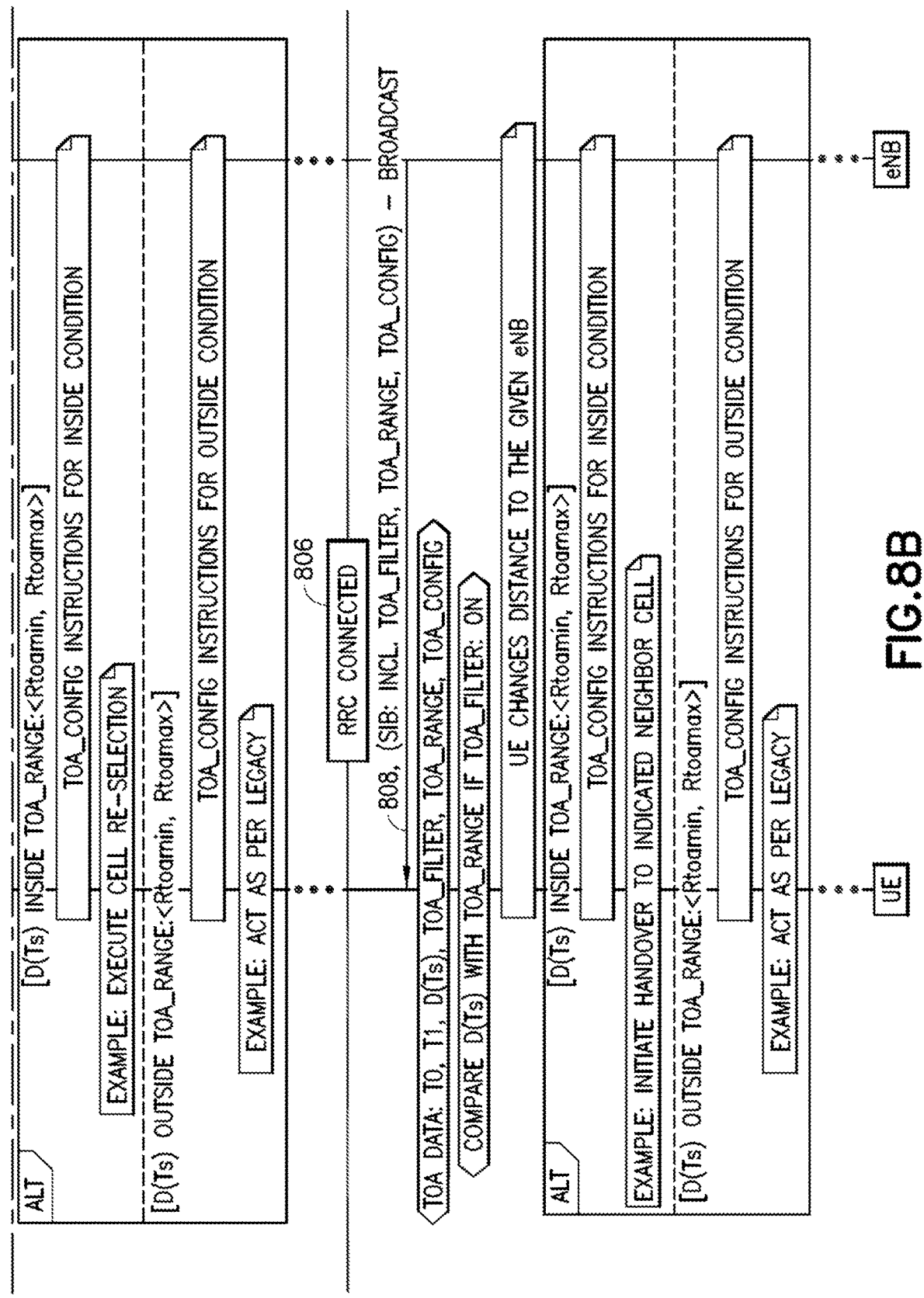
FIG. 8 gives an example of a signaling diagram for TOA-based range filtering.

FIG. 8 illustrates examples of the application of the present method when the UE is in an RRC_IDLE (section 802), initiate connection (section 804), or in an RRC_CONNECTED state (section 806). Indicated distance-based specific instructions for UE may be configurable, and the examples have only been provided for illustrative purposes.

As part of TOA data, at 808, the eNB may transmit or broadcast, as part of SIB data, configuration data related to the TOA-based range filter, namely:

- TOA_filter: ON/OFF—filter status activation flag for TOA-based range filter. If it is set to ON, filtering may be applied, whereas when it is in OFF, the UE may act as per legacy, without filtering.
- TOA_range: $<R_{toamin}, R_{toamax}>$—defines distance-based filter boundaries, which should be compliant with minimum and maximum cell range. In general, more sectors of filter application per cell may be defined.
- TOA_config—includes instructions for UEs, which may be effective when UE is inside or outside range filter defined sectors. Assumptions may be that only a change from legacy behavior may be defined with respect to inside or outside state of the filter. The instructions provided may be applied to any defined UE configuration.

TOA-based range filter specific data together with TOA data ($T_0$) used for UE positioning or RRC management may be received by the UE. The UE may measure TOA-based distance to the given eNB ($D(T_S)$) using reference signal reception time ($T_1$) and Equation 1. The accuracy of this measurement may be equal to $T_S$.

In the next step, UE may compare measured distance $D(T_S)$ with filter boundaries indicated in TOA_range: $<R_{toamin}, R_{toamax}>$ to determine whether UE is INSIDE or OUTSIDE filter boundaries, see Equation 2, which were defined by the given eNB.

Depending on conditions specified in TOA_config for INSIDE or OUTSIDE state of the UE, UE may be requested by the given eNB to perform a distance-based specific instruction. Indicated instructions may be effective only when TOA_filter is set to ON.

Separate instructions may be defined for RRC_IDLE, transition, or RRC_CONNECTED state; only some states may be supported.

Exemplary instructions may be found at FIG. 8, but it should be clear that more specific instructions may be defined, which may be distance-dependent or distance-triggered by activation criteria for TOA-based range filtering.

In FIG. 8, it is assumed that TOA_filter is ON. For TOA_filter set to OFF, TOA-based range filtering is not applied.

RRC_IDLE STATE (802):

A UE in an RRC_IDLE state (see FIG. 8, the top section) is not connected to any eNB, but it may receive broadcasts containing SIBs in order to establish a connection when needed. Thus, the UE may also receive TOA-related data used for filtering. Once a distance measurement ($D(T_S)$), as in Equation 1, indicates that the UE change its INSIDE/OUTSIDE or OUTSIDE/INSIDE TOA-based range filter status (TOA_range) with respect to the given eNB, the UE may check in TOA_config whether some instructions were requested by the given eNB. If yes, UE may initiate such actions without the need for communication with the given eNB.

An example of distance-sensitive or TOA-based range filtering triggered instructions may be:

- Start/stop tracing.
- Activation/deactivation of specific measurements
- Services activation/deactivation.

A significant benefit of TOA-based range filtering may be that there is no need for UE positioning data (GPS) to activate or trigger the instructions mentioned as the proposed functionality is purely mobile-network-based.

RRC_IDLE STATE—SWITCH TO RRC_CONNECTED STATE (804):

A UE in an RRC transition state switching from RRC_IDLE to RRC_CONNECTED (see FIG. 8, the middle section) may select a serving cell and initiate a random access procedure toward such a cell. Under normal conditions, the strongest cell may be selected as the serving cell. The UE at this stage may not be aware of cell-related performance parameters, such as throughput and capacity, and, in legacy solutions, the eNB may accept UE requests for the given cell, and then may instruct the UE to perform handover or any other action related to load balancing.

The main issue is that the UE first needs to establish a connection, and then, for example, radio resource optimization or load balancing may be requested by the eNB.

Once TOA-based range filtering is used, the eNB may, as part of TOA_config data augmented by the eNB, enforce restrictions on radio-resource access to the given cell due to load-balancing issues, where a neighbor cell ID may be included for cell reselection purposes. The main benefit may be that the UE may directly request an optimal cell for radio resources, for which a cell ID is included in TOA_config data, even when its signal strength is not the highest.

On the same basis, a selection of technologies, that is, LTE or 5G, for example, may be triggered based on distance criteria even before the first connection is established.

Another example of an application may be UE muting when the UE is in a defined distance from the given eNB.

Yet another example may be UE headroom power control triggered by the TOA-based range filter, which may be additionally used for the given locations or distances from the given eNB.

The present method may be also applied for cell-size restriction, when it is requested by an operator. In this case, the TOA filter may be configured to block access to the UE, which may be beyond a defined range. At the same time, TOA_config may include information on the cell ID for which the UE should perform an RACH procedure, if necessary.

RRC_CONNECTED STATE (806):

A UE in an RRC_CONNECTED state (see FIG. 8, the bottom section) may be already served by the given cell but, due to UE mobility, the UE may enter into a defined TOA-based range-filtered sector, where, for example, the subjects of a TOA_config configuration, different radio resource conditions, may be foreseen.

As for example, lower or higher maximum throughput may be proposed, carrier aggregation, LTE-5G interworking may be initiated or area-based services may be activated or deactivated, and so on.

As for another example, a handover procedure may be initiated. The benefit from such an action may be that current radio conditions may not trigger handover, but, due to topography or other conditions, significant degradation of signal from the given eNB may be expected at some distance. Thus, the handover procedure may be initiated earlier, where good radio conditions may still be expected.

It means that some distance-based actions may be triggered, and UE mobility or performance optimization may be expected with respect to current, measurement-based criteria, which may not be aware of coverage and cell topography issues.

In summary:

The method presented in the present disclosure enables TOA-based range filtering, which may be applied directly at the site of the UE. To enable such functionality, the eNB needs to transmit or broadcast a configuration for a TOA-based range filter, which defines, among other things, sector sizes and expected or intended actions or instructions, which may be triggered at the UE at the defined distance from the given eNB.

The requested actions or instructions triggered by the TOA-based range filter may be mandatory or optional for the UE, which may be configured.

The main benefit of the present method is that actions or instructions indicated in TOA_config for UEs may be invoked or executed based on distance or proximity criteria. No additional radio resources may be needed to request such actions. This may be especially important in case of load balancing, where a current state of the mobile network may be reflected to the UE, which may be directly instructed to which cell it should perform a random access procedure, when necessary. This new development may have significant value, as cell signal strength does not reflect the operational status of the given cell in terms of possible throughput, capacity and available radio resources. When TOA-based range filtering is applied, the UE which is within the coverage of such a cell, and, presumably, in a coverage of some neighbor cells, may be informed in advance, which cell should be selected with respect to serving cell operational capabilities issues. Thus, reduction in necessary control signaling may be expected with respect to current solutions.

The present method may be applied to any synchronous communication standards, such as GSM, LTE or 5G.

Figure 9:
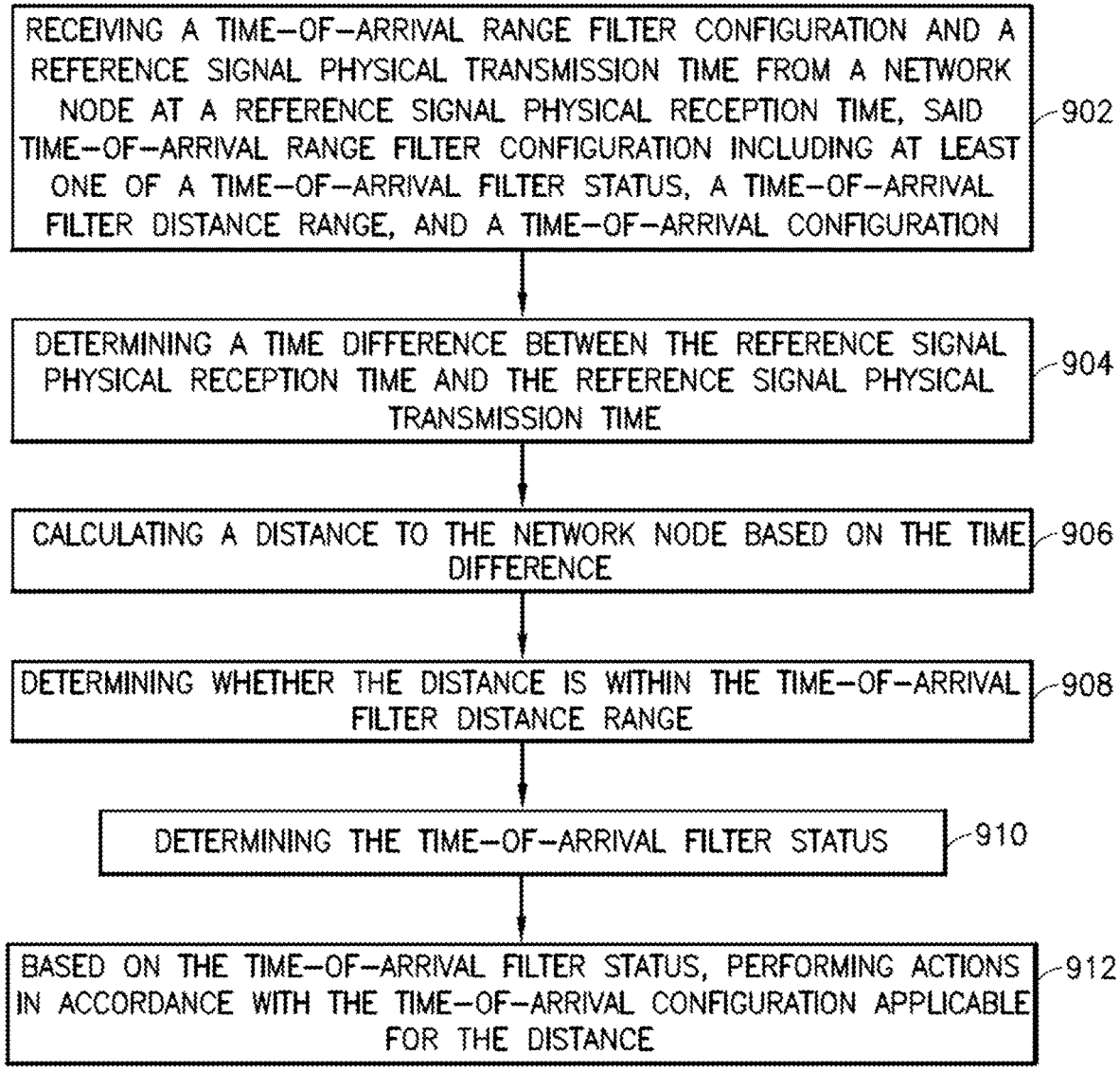
FIG. 9 is a flow chart illustrating a method performed by a user equipment in accordance with the present disclosure.

FIG. 9 is a flow chart illustrating a method performed by a user equipment in accordance with the present disclosure. In block 902, the user equipment receives a time-of-arrival range filter configuration and a reference signal physical transmission time from a network node at a reference signal physical reception time. The time-of-arrival range filter configuration includes at least one of a time-of-arrival filter status, a time-of-arrival filter distance range, and a time-of-arrival configuration. In block 904, the used equipment determines a time difference between the reference signal physical reception time and the reference signal physical transmission time. At block 906, the user equipment calculates a distance to the network node based on the time difference. In block 908, the user equipment determines whether the distance is within the time-of-arrival filter distance range. In block 910, the user equipment determines the time-of-arrival filter status. And, in block 912, based on the time-of-arrival filter status, the user equipment performs actions in accordance with the time-of-arrival configuration applicable for the distance.

Figure 10:
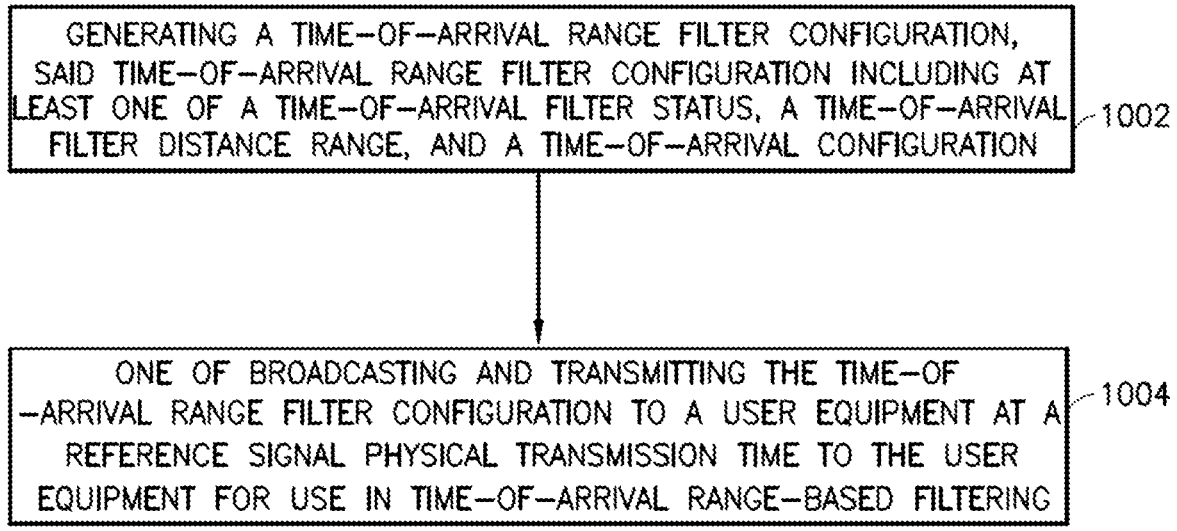
FIG. 10 is a flow chart illustrating a method performed by a base station in accordance with the present disclosure.

FIG. 10 is a flow chart illustrating a method performed by a base station in accordance with the present disclosure. In block 1002, the base station generates a time-of-arrival range filter configuration. The time-of-arrival range filter configuration includes at least one of a time-of-arrival filter status, a time-of-arrival filter distance range, and a time-of-arrival configuration. And, in block 1004, the base station broadcasts or transmits the time-of-arrival range filter configuration to a user equipment at a reference signal physical transmission time to the user equipment for use in time-of-arrival range-based filtering.

In general, the various exemplary embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although the invention is not limited thereto.

While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components, such as integrated circuit chips and modules, and that the exemplary embodiments of this invention may be realized in an apparatus that is embodied as an integrated circuit. The integrated circuit, or circuits, may comprise circuitry, as well as possibly firmware, for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. For example, while the exemplary embodiments have been described above in the context of advancements to the 5G NR system, it should be appreciated that the exemplary embodiments of this invention are not limited for use with only this one particular type of wireless communication system. The exemplary embodiments of the invention presented herein are explanatory and not exhaustive or otherwise limiting of the scope of the invention.

The following abbreviations may have been used in the preceding discussion:
CU Centralized Unit
DL Downlink
DU Distributed Unit
eNB eNodeB (4G Base Station)
GHz Gigahertz
gNB gNodeB (5G Base Station)
gNB-CU gNB Centralized Unit
gNB-DU gNB Distributed Unit
GSM Global System for Mobile Communications
HetNet Heterogeneous Network
ID Identifier
LTE Long Term Evolution
NR New Radio (5G)
RACH Random Access Channel
RAN Radio Access Network
RF Radio Frequency
RRC Radio Resource Control
Rx Receiver
SIB System Information Block
TA Timing Advance
TOA Time of Arrival
Tx Transmitter
UE User Equipment
UL Uplink
3GPP $3^{rd}$ Generation Partnership Project
5G $5^{th}$ Generation
5GC 5G Core The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various modifications and adaptations may become apparent to those skilled in the relevant arts in view of the foregoing description, when read in conjunction with the accompanying drawings. However, any and all modifications of the teachings of this disclosure will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the claims to follow.

The invention claimed is:

1. A method comprising:
receiving a time-of-arrival range filter configuration and a reference signal physical transmission time from a network node at a reference signal physical reception time, said time-of-arrival range filter configuration including at least one of a time-of-arrival filter status, a time-of-arrival filter distance range, and a time-of-arrival configuration;
determining a time difference between the reference signal physical reception time and the reference signal physical transmission time;
calculating a distance to the network node based on the time difference;
determining whether the distance is within the time-of-arrival filter distance range;
determining the time-of-arrival filter status; and
based on the time-of-arrival filter status, performing actions in accordance with the time-of-arrival configuration applicable for the distance.

2. The method of claim 1, wherein the time-of-arrival filter status is one of ON and OFF.

3. The method of claim 2, further comprising, when the time-of-arrival filter status is OFF, performing actions in accordance with legacy procedures.

4. The method of claim 1, wherein at least one of:
the applicable time-of-arrival configuration depends on whether the distance is within the time-of-arrival filter distance range or outside the time-of-arrival filter distance range; or
the applicable time-of-arrival configuration is that no action is taken.

5. The method as claimed in claim 1, wherein the time-of-arrival filter distance range comprises at least one of a lower range filter limit and an upper range filter limit.

6. The method as claimed in claim 1, wherein the time-of-arrival configuration includes instructions for an RRC_IDLE state, a transition state, and an RRC_CONNECTED state.

7. An apparatus comprising:
at least one processor; and
at least one non-transitory memory storing instructions that, when executed with the at least one processor, cause the apparatus to:
receive a time-of-arrival range filter configuration and a reference signal physical transmission time from a network node at a reference signal physical reception time, said time-of-arrival range filter configuration including at least one of a time-of-arrival filter status, a time-of-arrival filter distance range, and a time-of-arrival configuration;
determine a time difference between the reference signal physical reception time and the reference signal physical transmission time;
calculate a distance to the network node based on the time difference;
determine whether the distance is within the time-of-arrival filter distance range;

determine the time-of-arrival filter status; and based on the time-of-arrival filter status, perform actions in accordance with the time-of-arrival configuration applicable for the distance.

8. The apparatus of claim 7, wherein the time-of-arrival filter status is one of ON and OFF.

9. The apparatus of claim 8, wherein the instructions, when executed with the at least one processor, cause the apparatus to, when the time-of-arrival filter status is OFF, perform actions in accordance with legacy procedures.

10. The apparatus of claim 7, wherein the applicable time-of-arrival configuration depends on whether the distance is within the time-of-arrival filter distance range or outside the time-of-arrival filter distance range.

11. The apparatus of claim 7, wherein the time-of-arrival filter distance range comprises at least one of a lower range filter limit or an upper range filter limit.

12. The apparatus of claim 7, wherein the applicable time-of-arrival configuration is that no action is taken.

13. The apparatus of claim 7, wherein the time-of-arrival configuration includes instructions for an RRC_IDLE state, a transition state, and an RRC_CONNECTED state.

14. An apparatus comprising:
at least one processor; and
at least one non-transitory memory storing instructions that, when executed with the at least one processor, cause the apparatus to:
generate a time-of-arrival range filter configuration, said time-of-arrival range filter configuration including at least one of a time-of-arrival filter status, a time-of-arrival filter distance range, and a time-of-arrival configuration; and
one of broadcast or transmit the time-of-arrival range filter configuration to a user equipment, at a reference signal physical transmission time to the user equipment, for use in time-of-arrival range-based filtering.

15. The apparatus of claim 14, wherein the time-of-arrival range filter configuration is broadcast as part of a system information block.

16. The apparatus as claimed in claim 14, wherein the instructions, when executed with the at least one processor, cause the apparatus to dynamically change the time-of-arrival range filter configuration in response to a change in network status or performance.

17. The apparatus as claimed in claim 14, wherein the time-of-arrival filter status is one of ON and OFF.

18. The apparatus as claimed in claim 14, wherein the applicable time-of-arrival configuration depends on whether a distance to the user equipment is within the time-of-arrival filter distance range or outside the time-of-arrival filter distance range.

19. The apparatus as claimed in claim 14, wherein the time-of-arrival filter distance range comprises at least one of a lower range filter limit and an upper range filter limit.

20. The apparatus as claimed in claim 14, wherein the time-of-arrival configuration includes instructions for an RRC_IDLE state, a transition state, and an RRC_CONNECTED state of the user equipment.

* * * * *